United States Patent
Coronado et al.

(10) Patent No.: US 7,783,931 B2
(45) Date of Patent: Aug. 24, 2010

(54) ALTERNATE COMMUNICATION PATH BETWEEN ESSNI SERVER AND CEC

(75) Inventors: Juan A. Coronado, Tucson, AZ (US); Veronica S. Davila, Tucson, AZ (US); Jack N. Licano, Jr., Fontana, CA (US); Brian S. McCain, Mountain View, CA (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/744,491

(22) Filed: May 4, 2007

(65) Prior Publication Data

US 2008/0276255 A1    Nov. 6, 2008

(51) Int. Cl.
G06F 11/00    (2006.01)
(52) U.S. Cl. .......................................... 714/43; 714/44
(58) Field of Classification Search .................... 714/43, 714/44, 56, 2, 11–13
See application file for complete search history.

(56) References Cited

U.S. PATENT DOCUMENTS

| | | | |
|---|---|---|---|
| 5,537,574 A | 7/1996 | Elko et al. | |
| 6,496,942 B1 | 12/2002 | Schoenthal et al. | |
| 6,618,783 B1 * | 9/2003 | Hammersley | 710/305 |
| 6,829,720 B2 | 12/2004 | Schoenthal et al. | |
| 7,111,084 B2 | 9/2006 | Tan et al. | |
| 7,127,633 B1 | 10/2006 | Olson et al. | |
| 7,339,937 B2 * | 3/2008 | Mitra et al. | 370/395.53 |
| 2003/0149812 A1 | 8/2003 | Schoenthal et al. | |
| 2007/0192597 A1 * | 8/2007 | Bade et al. | 713/167 |

FOREIGN PATENT DOCUMENTS

| | | | |
|---|---|---|---|
| JP | 2005293595 A | 10/2005 | |
| WO | 9500906 A1 | 1/1995 | |

* cited by examiner

*Primary Examiner*—Dieu-Minh Le
(74) *Attorney, Agent, or Firm*—Griffiths & Seaton PLLC

(57) ABSTRACT

An enterprise network interface client application and a local, central electronic complex (CEC) in a dual CEC environment implement an alternative method of communication. Upon a send failure of a command to a first CEC in the environment, the command is sent to a second CEC using a CEC to CEC message mechanism. A method of communicating an asynchronous event is implemented between a microcode layer and an enterprise network interface client application in a dual central electronic complex (CEC) environment. A copy of the event is retained. Upon a send failure of the event to a first CEC in the environment, the copy of the event is sent to a second CEC in the environment.

15 Claims, 6 Drawing Sheets

ALTERNATE COMMUNICATION PATH BETWEEN ESSNI SERVER AND CEC

BACKGROUND OF THE INVENTION

1. Field of the Invention

The present invention relates in general to computers, and more particularly to a system and method of communication between components in a storage system.

2. Description of the Prior Art

In storage controller components such as the IBM® DS8000 and DS6000 storage controllers, communication between the ESSNI (enterprise storage server network interface) server and the NI (network interface) server running in each central electronic complex (CEC) of a CEC storage controller is performed via transport control protocol/internet protocol (TCP/IP) sockets. These sockets are opened at startup time, and the connection remains active as long as the NI is running. The communication path is bidirectional. The communication path is used to send requests from the ESSNI client to a microcode layer that processes the respective request. Microcode layers use the communication path to send asynchronous events to ESSNI client applications.

For requests from ESSNI client applications to a microcode layer that will process the request, the NI server will send the request to a device driver using a Kernel Pipe Interface. The operating system (OS) will receive the request from the driver and forward the request to different microcode layers resident in a respective CEC kernel.

For asynchronous events from a microcode layer to the ESSNI client application that will process the asynchronous event, the OS will send the asynchronous event through the Kernel Pipe Interface to the NI server. The NI server will then route the asynchronous event to the ESSNI client application through the communication path.

For a variety of reasons, errors can occur in the connection path between ESSNI server and CEC, and vice-versa. In the case of a catastrophic communication error, the ESSNI server will not be able to send the respective command to the CEC. Customers can suffer from long hours of downtime because the customer cannot have access to storage controller resources until the communication error is fixed.

SUMMARY OF THE INVENTION

In light of the foregoing, a need exists for a system and method of providing a communication path between ESSNI server and CEC, and vice-versa, in the event of a communication error to ensure that storage controller resources can continue to be accessible. The system and method should be compatible with existing standards and make use of existing system resources to make an implementation cost-effective and efficient.

Accordingly, in one embodiment, the present invention is a computer-implemented method of communication between an enterprise network interface client application and a local, central electronic complex (CEC) in a dual CEC environment, comprising, upon a send failure of a command to a first CEC in the environment, sending the command to a second CEC using a CEC to CEC message mechanism.

In another embodiment, the present invention is a method of communicating an asynchronous event between a microcode layer and an enterprise network interface client application in a dual central electronic complex (CEC) environment, comprising retaining a copy of the event, and, upon a send failure of the event to a first CEC in the environment, sending the copy of the event to a second CEC in the environment using a CEC to CEC message mechanism.

In still another embodiment, the present invention is a method of communicating an asynchronous event between a microcode layer and an enterprise network interface client application in a dual central electronic complex (CEC) environment, comprising retaining a copy of the event, and, upon a send and retry failure of the event to a first CEC in the environment, sending the copy of the event to a second CEC in the environment using a CEC to CEC message mechanism.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS OF THE INVENTION

Figure 1:
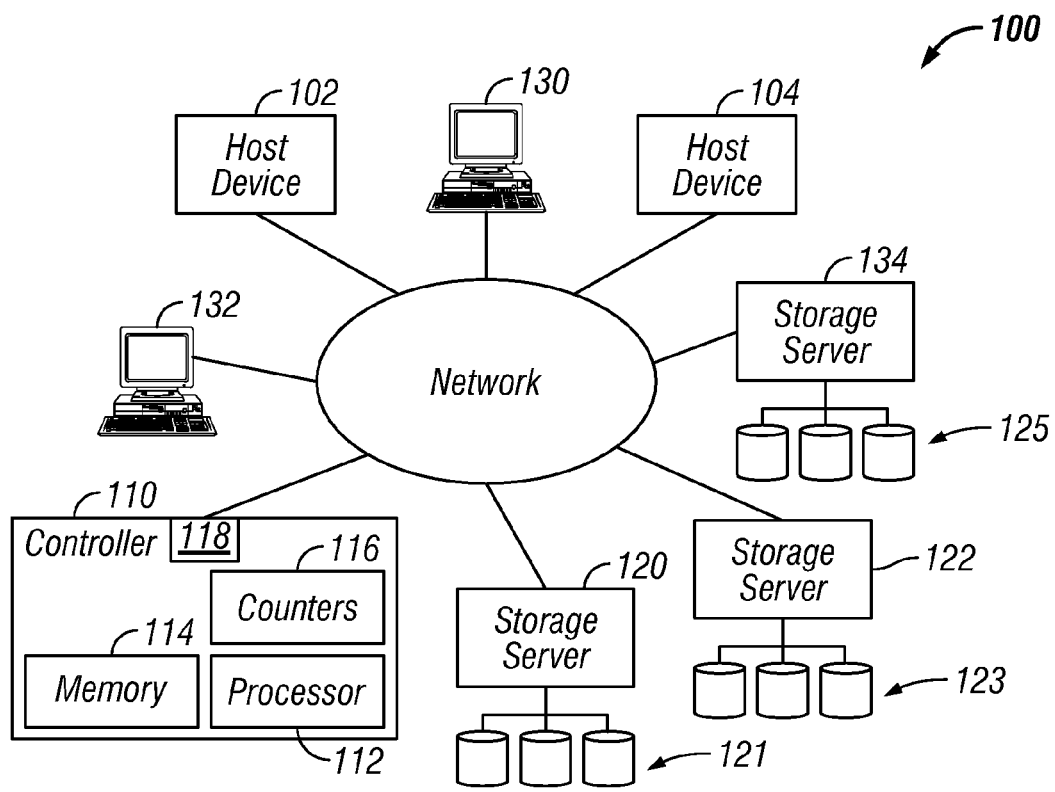
FIG. 1 illustrates an example computing environment in which certain aspects of the present invention can be implemented.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of a data network 100 in which the present invention may be implemented. The network 100 includes one or more host devices 102 and 104, a controller or server 110 and other storage servers 120, 122, 134 with attached data storage devices 121, 123 and 125. Other devices 130 and 132 may also be attached to the network 100. The controller 110 may be an IBM® Enterprise Storage Server and includes a processor 112, memory 114 and counters 116 as well as appropriate network interfaces 118. The processor 112 is programmed with instructions stored in the memory 114 for managing I/O operations requested by the host devices 102, 104 as well as for computing network I/O performance statistics. The storage devices 121, 123, 125 may be any type of removable or fixed physical storage including, without limitation, electronic memory (such as RAM or solid state memory), hard disks, RAID arrays, tape cartridges, optical discs and other media. Removable media may be (but need not be) contained with an automated data storage library. As will be appreciated, the counters 116 may be implemented in hardware or software.

Figure 2:
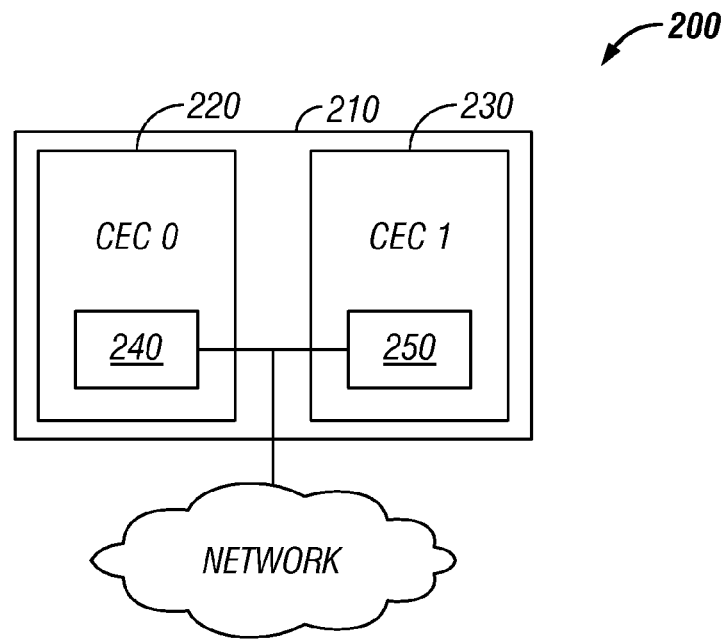
FIG. 2 illustrates a conceptual block diagram of example computing components which can implement aspects of the present invention.

Turning to FIG. 2, a block diagram conceptual illustration of a dual central electronic complex (CEC) storage controller 210 environment 200 is shown. Controller 210 includes a first CEC 220 (here denoted as CEC 0) coupled to a second CEC 230 (denoted as CEC 1 via a signal bearing medium to the network, using local network interface (NI) devices 240, 250 which are operational in each CEC 220, 230 of the controller 210.

Requests from the ESSNI client are stored in command objects, which contain the request type, parameters, and relevant data for the request. Two copies of the command are created on the client: one for CEC 0, and one for CEC 1. Both commands are sent to be processed simultaneously on the CECs. After processing, the command responses are returned to the client, where the results are combined and returned to the user as a single response. The NI code on each CEC determines what resources to execute the command against based on the type of request in the command. For the configuration requests, the NI is notified of which CEC is the owner, and the command is executed in that respective CEC. The other CEC returns the command as a so-called "no-op".

For some commands, like copy services commands, the volumes involved (specified as parameters by the client) are divided by NI based on LSS (logical subsystem) ownership. In a dual CEC controller, CEC 0 owns all even logical subsystems. CEC 1 owns all odd logical subsystems. If the current CEC owns the respective LSS, the request is executed against it. If the CEC does not own the LSS, the request is skipped.

As long as the NI communication path is error free, the requests from ESSNI client are sent to the correct CEC for processing by a microcode layer process. However, when an error occurs in the communication path, the error might lead to a catastrophic failure. Any error in the communication path would be detected either when a command is sent or when a heartbeat is failed. Errors in the communication path may occur due to a hardware failure or Ethernet cable disconnection or Ethernet cable misconfiguration. For a catastrophic communication error, the ESSNI client will not be able to send the command to the CEC. The end result is that customers suffer from long hours of downtime because the customer cannot access the storage controller resources until the communication error is resolved (for example, resources like devices for usage in a copy services application).

The present invention uses the alternative communication path between ESSNI server and a CEC in the storage control unit when the direct communication path between ESSNI and the CEC that owns the resources has an error. For example, using the present invention, a user can configure devices for copy services functions even though one of the two communication paths between ESSNI server and the storage controller CEC is not available.

When a communication error occurs, and the retry of the communication error also fails, the communication application in the ESSNI server can reroute the command to the other CEC. The ESSNI server application can indicate in the CEC ownership field of the command which CEC owns the command. When the OS receives the command, the OS can query the CEC ownership field of the command, and send the command to the other cluster if the CEC ownership field indicates that the command belongs to the other CEC. The OS can use its CEC to CEC message mechanism to send the command to the other CEC.

In the other CEC, the OS can then dispatch the command to the microcode layer that will process the command. To the microcode layer, the way the command arrived at the CEC will be transparent. The microcode layer processes the command, and the microcode builds a response to the command if a response to the command is required. The microcode layer then returns the response to the OS. The OS will then use the CEC to CEC mail mechanism to send the microcode layer response to the other CEC. The other CEC will then send the response to the NI server, and the NI server will propagate the response all the way to the ESSNI client.

Figure 3:
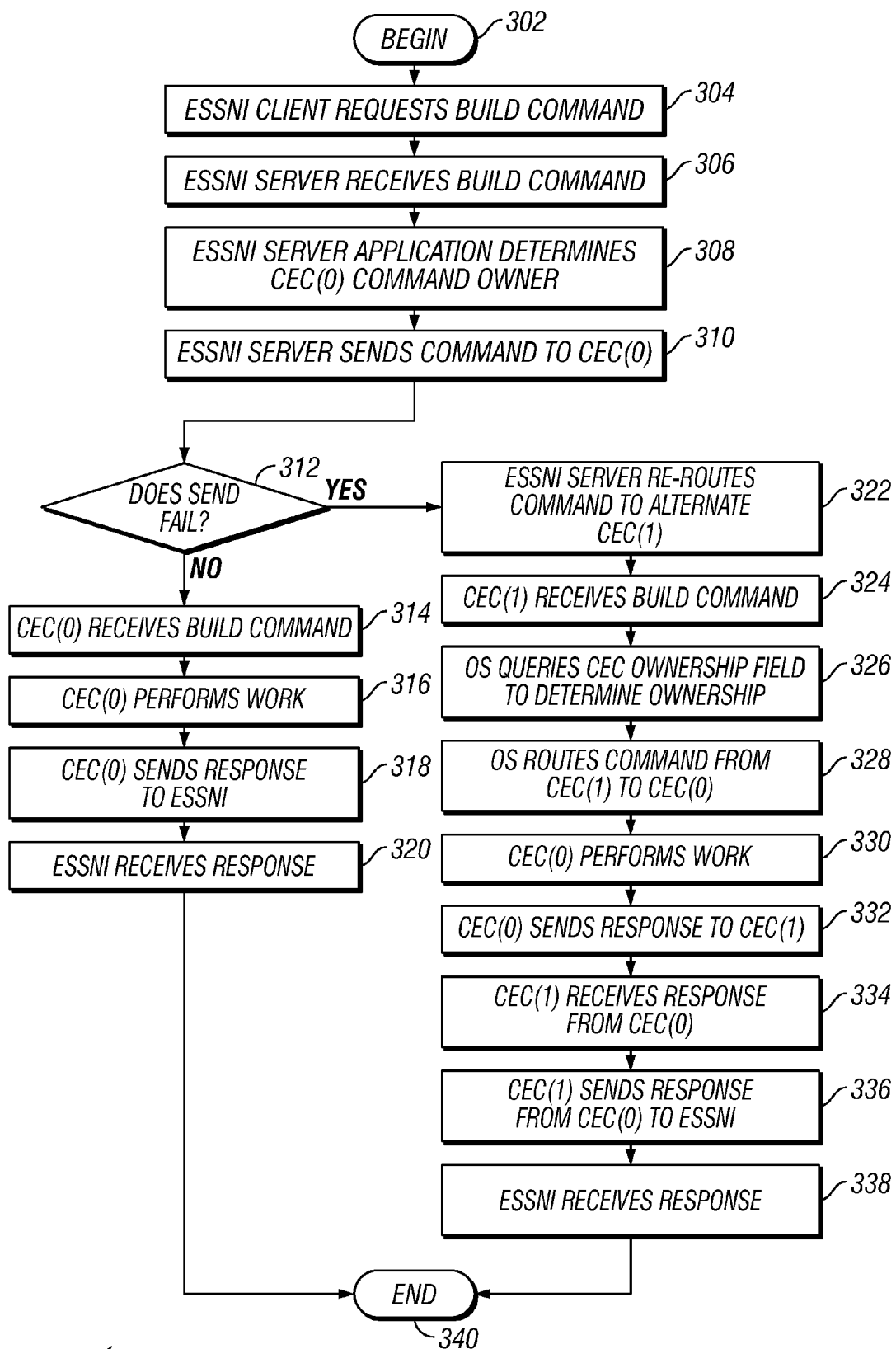
FIG. 3 illustrates a first example method of implementing various aspects of the present invention.

Turning to FIG. 3, an example first method of implementing various aspects of the present invention is depicted. Method 300 begins (step 302) by the ESSNI client application requesting a command, such as a "build" command (step 304). The ESSNI server receives the build command (step 306). The ESSNI server application determines that CEC(0) is the command owner (step 308). As a result, the ESSNI server sends the command to CEC(0). If the send is successful (step 312), then CEC(0) receives the build command (step 314). The CEC(0) performs work according to the command (step 316). The CEC(0) generates a response to the command, and sends the response to the ESSNI server (step 318). The ESSNI server then receives the response (step 320).

If the send is not successful (send failure), the ESSNI server re-routes the command to the alternate CEC(1) (step 322). The CEC(1) receives the build command (step 324). The OS executing on the environment queries the CEC ownership field in the command to determine ownership (step 326). The OS then routes the command from CEC(1) to CEC(0) using a CEC to CEC mail mechanism. Such a mechanism can be performed as shown in FIG. 4, by use of cross cluster mail link 432 (see FIG. 4).

As a next step, CEC(0) performs work according to the command (step 330). The CEC(0) then generates and sends a response from CEC(0) to CEC(1), again over the cross cluster mail link, for example (step 332). The CEC(1) receives the response from CEC(0) step 334. The CEC(1) sends the response generated from CEC(0) to the ESSNI (step 336) server. As a final step, the ESSNI server receives the respective response (step 338). Method 300 then ends (step 340).

Figure 4:
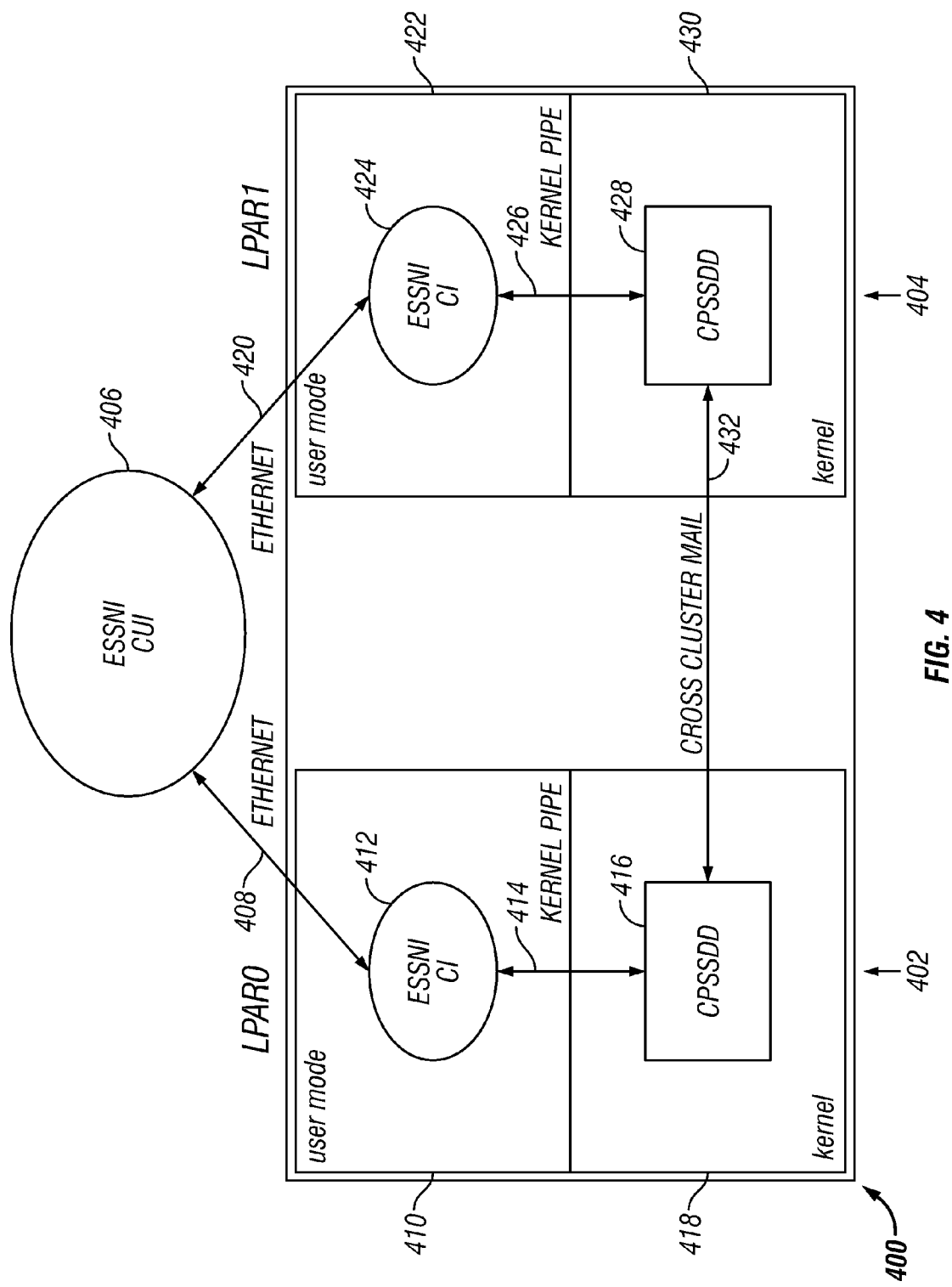
FIG. 4 illustrates a block diagram of example network connections and communications channels in which aspects of the present invention can be implemented.

FIG. 4 illustrates an example connection path and configuration 400 for communication between ESSNI and Device Driver according to various aspects of the present invention. Configuration 400 is logically partitioned into partition 402 and partition 404. An ESSNI graphical user interface (GUI) provides control for both partitions, via Ethernet signal bearing mediums 408, 420. Partition 402 includes user mode 410, having an ESSNI common interface (CI) 412 which uses kernel pipe 414 to connect with Device Driver 416 in kernel 418. Similarly, partition 404 includes user mode 422 having an ESSNI CI 424, which uses kernel pipe 426 to connect with Device Driver 428 in kernel 430. Finally, a CEC to CEC mail mechanism 432.

When a microcode layer in a dual CEC environment wishes to send a so-called "asynchronous event" to an ESSNI client application, the microcode layer builds an asynchronous event message. The asynchronous event message header contains the type of asynchronous event that is being sent from the microcode layer. All asynchronous events are sent from a microcode layer to the local NI server regardless of whether there is a target (i.e., a client). ESSNI clients register with NI servers to receive types of events. When a respective NI server receives an asynchronous event from microcode, the NI server passes the asynchronous event along to all ESSNI clients that have registered for it. If no ESSNI client has registered for it, then the NI server simply drops the registered event.

The microcode layer tells the OS to send the asynchronous event. The OS uses the kernel pipe connection to send the asynchronous event to the respective NI server on the respective local CEC. The NI server on that local CEC will then forward the asynchronous event to the ESSNI client. The ESSNI client will then dispatch the asynchronous event to the target application (ESSNI client application).

One application of asynchronous events is in a copy service environment, microcode layers use asynchronous events to tell the ESSNI client applications of state changes in copy services relationships. In a configuration environment, microcode tells ESSNI client applications of the addition or deletion of one or more resources, like devices from a logical subsystem.

As long as the communication path between the kernel in the CEC and ESSNI client is error free, the asynchronous events from a microcode layer are sent through the local NI server to the ESSNI client application. However, when an error occurs in the communication path, the error might lead to a catastrophic failure. The communication path error might be between the kernel in the CEC and the NI server associated with the CEC, or between the NI server and the ESSNI client.

If the communications error is between the Kernel in the CEC and the NI server, then OS will detect the error, and the OS will tell the microcode layer that the asynchronous event was not sent due to a communication error.

If the communication error is between the NI server and the ESSNI client that has registered to receive the event, then the NI server would detect that problem. When the asynchronous event cannot be delivered from the server to the client, the server will store the events while reconnection attempts are made. If the client successfully reconnects to the server, the stored events are delivered at that time. If the reconnection fails after a certain number of attempts, the server drops the event.

Errors in the communication path may occur due to various factors, such as a hardware failure, Ethernet cable disconnection, Ethernet cable misconfiguration, or a closed kernel pipe. For a catastrophic communication error, the CEC will not be able to send the asynchronous event to the ESSNI client application. The end result is that customers do not know the state of the resources in the storage controller, such as devices used in copy services applications or the state of one or more resources owed by the CEC that has lost its communication path to the ESSNI client. Customers will not know the state of the devices until the communication error is fixed.

One aspect of the present invention takes into account the two types of communication errors when an asynchronous event is sent from a microcode layer to an ESSNI client application. In one embodiment, the present invention uses an alternate communication path between a CEC and the ESSNI client when there is an error in the local communication path between a CEC and local NI server or between the local NI server and ESSNI client.

In certain embodiments, the present invention may request the OS to retain a copy of the asynchronous event until the asynchronous event is successfully sent to the ESSNI client, and an asynchronous event status notification from NI server to OS. The present invention uses a common mechanism to recover from an error in the send of the asynchronous event. In one embodiment, the present invention covers the two cases in which an communication error prevents the send of the asynchronous event from a microcode layer to an client application.

Figure 5:
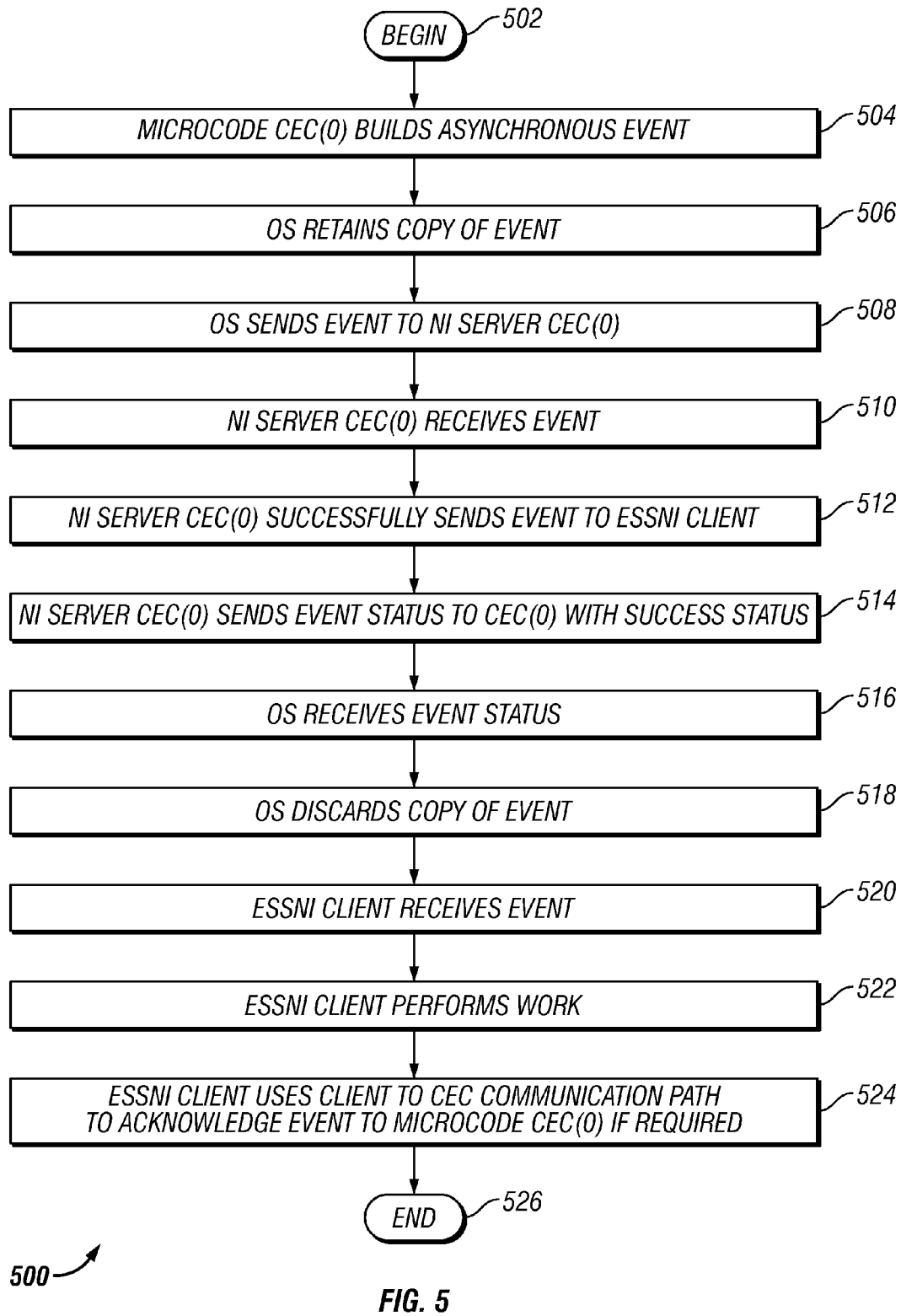
FIG. 5 illustrates a method of communication between components depicted in FIG. 4.

Turning to FIG. 5, a successful send (i.e., no errors in the communication path) of an asynchronous event from a microcode layer to an ESSNI client application is depicted in an example method 500. Method 500 begins (step 502) with the microcode layer in CEC(0) building the asynchronous event (step 504). The OS retains a copy of the event as previously described (step 506). The OS sends the event to the local NI server in CEC(0) (step 508). The local NI server in CEC(0) receives the event (step 510). The local NI server in CEC(0) then successfully sends the event to the ESSNI client (step 512).

As a follow up step, the NI server in CEC (0) sends a success status event status to the CEC(0) (step 514). The OS receives the event success status (step 516). The OS then discards its copy of the event (step 518). As a result of the ESSNI client receiving the event (step 520), the ESSNI client performs work (step 522). The ESSNI client then uses a client-to-CEC communication path to acknowledge the event to the microcode layer in CEC(0) if required (step 524). Method 500 then ends (step 526).

Figure 6:
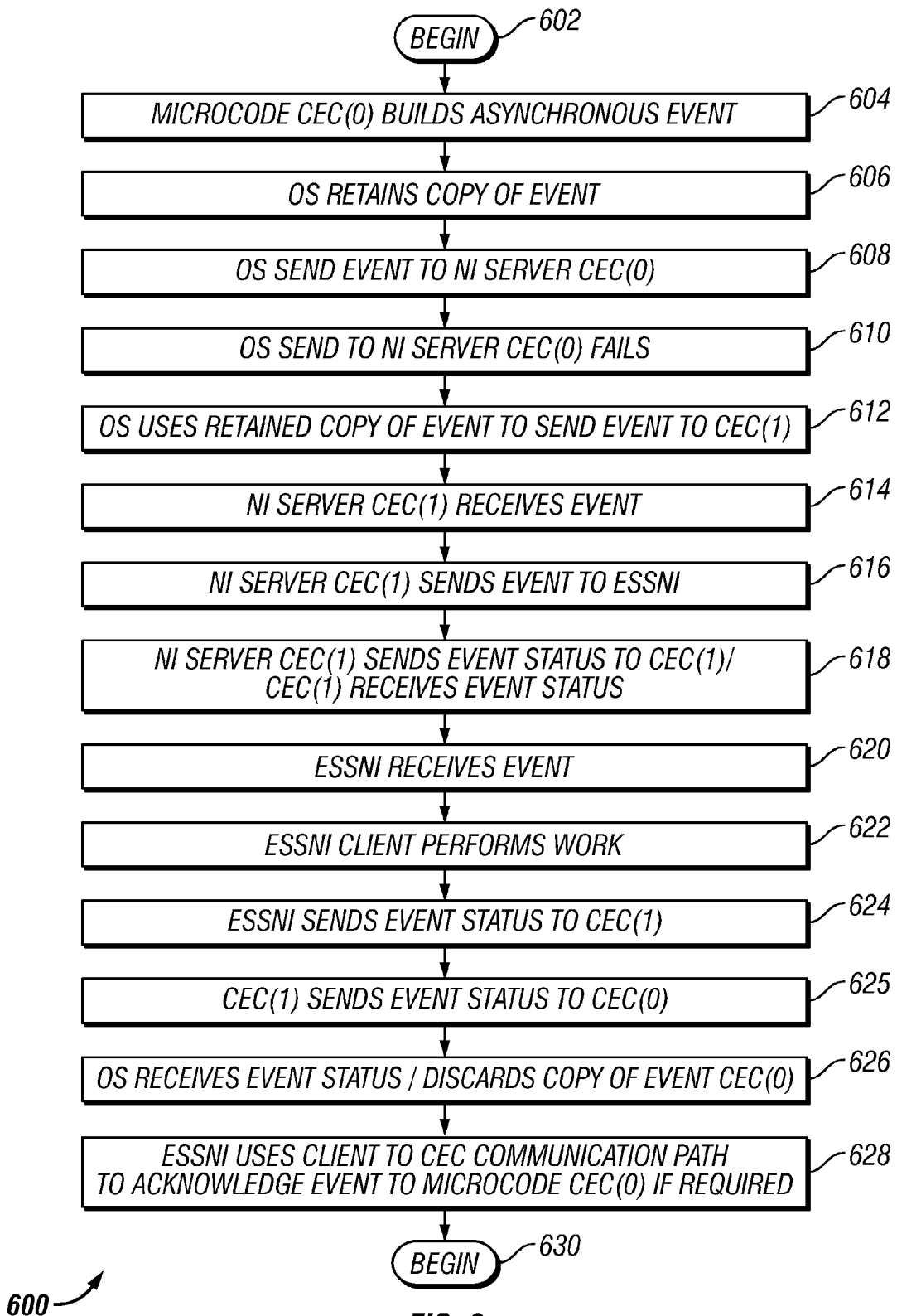
FIG. 6 illustrates a second example method of implementing various aspects of the present invention.

According to one embodiment of the present invention, when the OS detects an error in the communication path, for instance as a result of a closed kernel pipe, the OS will use the copy of the asynchronous event to re-route the asynchronous event to the other CEC. This error in the communication path is described in method 600 as depicted in FIG. 6. Method 600 begins (step 602), with the microcode layer in CEC(0) building the asynchronous event (step 604). The OS retains a copy of the event as previously described (step 606). The OS send the event to the NI server in CEC(0) (step 608), but due to a communication error, the send fails (step 610).

The OS then uses its retained copy of the event to send the event to CEC(1) (step 612). The local NI server in CEC(1) receives the event (step 614). The local NI server in CEC(1) then sends the event to the ESSNI (step 616). The local NI server in CEC(1) then sends a status event to the CEC(1), and the CEC(1) receives the event status (step 618). Meanwhile, the ESSNI receives the event (step 620). The ESSNI client performs work according to the event (step 622). The ESSNI sends an event status to CEC(1) (step 624). Using a CEC to CEC mail mechanism as described (step 625), CEC(1) sends the event status to CEC (0). The OS receives the event status and thereby discards its copy of the event (step 626). Finally, the ESSNI again uses a client to CEC communication path to acknowledge the event to the microcode layer in CEC(0) if required (step 628). Method 600 then ends (step 630).

Once an asynchronous event arrives at a respective local NI server, it is up to that NI server to notify the OS of the status of the asynchronous event. If the local NI server sent the asynchronous event successfully to the client, NI will tell OS that the asynchronous event was sent successfully. In such case, OS will proceed to get rid of its copy of the asynchronous event buffer, as has been described.

Figure 7:
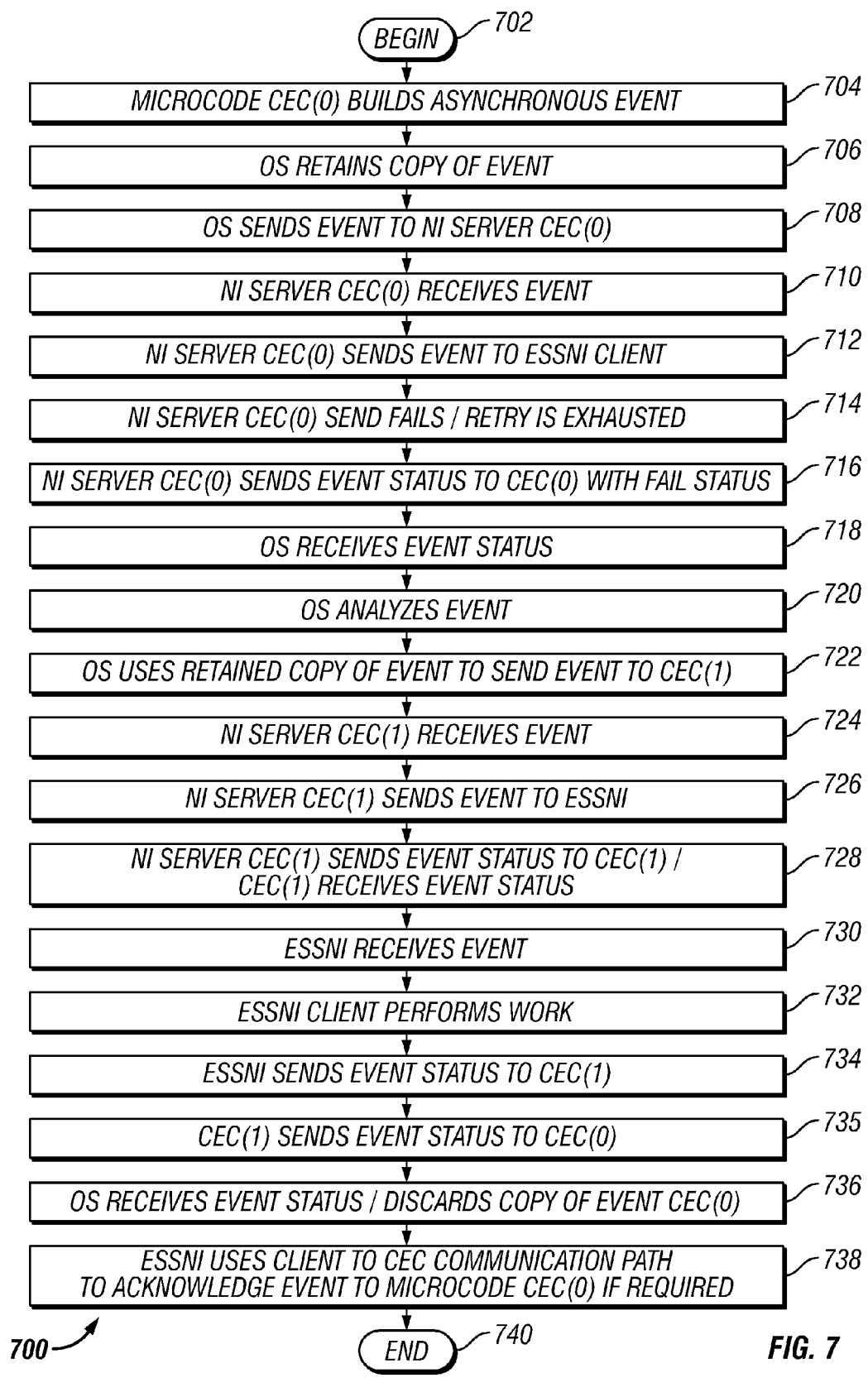
FIG. 7 illustrates a third example method of implementing various aspects of the present invention.

If a local NI server was unable to send the asynchronous event to the client even after its retries, the local NI server will tell the OS in the asynchronous event status that the send of the asynchronous event has failed. The OS can then re-route the asynchronous event to the other CEC. This response to an error in the communication path is described in method 700 as depicted in FIG. 7.

Method 700 begins (step 702), with the microcode layer in CEC(0) again building the asynchronous event (step 704). The OS again retains a copy of the event as previously described (step 706). The OS sends the event to the local NI server in CEC(0) (step 708). The local NI server in CEC(0) receives the event (step 710). The local NI server in CEC(0) then sends the event to the ESSNI client (step 712), but due to a communication error, the send fails and retries are exhausted (step 714).

As a next step, the local NI server in CEC (0) sends an event status to CEC(0) denoting a fail status (step 716). The OS receives the event status (step 718). The OS analyzes the event (step 720) status, partially to determine ownership information and next steps. The OS then uses its retained copy of the event to send to CEC(1) (step 722). The respective local NI server in CEC(1) receives the event (step 724), and the NI server sends the event to the ESSNI (step 726) as well as sending the event status to CEC(1) (step 728). The ESSNI receives the event (step 730), performs works according to the event (step 732), sends an event status to CEC(1) (step 734), using CEC to CEC communication. CEC(1) sends the event status to CEC (0) (step 735). The OS receives the event status and discards its copy of the event (step 736). Finally, the ESSNI uses a client to CEC communication path to acknowledge the event to the microcode layer in CEC(0) if required. The method 700 then ends (step 740).

For both cases of communication path error as described in methods 600 and 700, CEC(1) will use its communication path to send the asynchronous event to the ESSNI Client. When the OS receives the message from the CEC with a failed communication path to the ESSNI client, the OS will use its communication path to send the message to the ESSNI client. When NI server receives the message, it will send the message to the ESSNI client. The ESSNI client will use the asynchronous event type to dispatch the client process. The ESSNI client application will process the asynchronous event. To the client application, the way the asynchronous event arrived at the ESSNI client will be transparent.

Again, in general, software and/or hardware to implement various embodiments of the present invention, or other functions previously described, such as re-routing a command from a first CEC to a second CEC in the environment, can be created using tools currently known in the art.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of communication between an enterprise network interface (ESSNI) client application and a local, central electronic complex (CEC) in a dual CEC environment, comprising:
   sending a command to the local CEC;
   determining a send failure of the command to the local CEC; and
   re-sending the command to the local CEC via an alternative communication path comprising a first device driver integrated into a remote CEC in the dual CEC environment;
      wherein the alternative communication path further comprises a cross cluster mail link connecting the first device driver and a second device driver integrated into the local CEC, forming a CEC to CEC mail mechanism.

2. The method of claim 1, further including dispatching the command to a microcode layer to process the command.

3. The method of claim 2, further including processing the command and building a response to the command by the microcode layer.

4. The method of claim 3, further including returning the response via the CEC to CEC mail mechanism from the second CEC to the first CEC.

5. The method of claim 4, further including sending the response from the local CEC to the ESSNI client application.

6. The method of claim 1, wherein re-sending the command to the remote CEC is performed by an operating system (OS) executing on the dual CEC environment.

7. A system for communication between an enterprise network interface (ESSNI) client application and a local, central electronic complex (CEC) in a dual CEC environment via an alternative communication path using a remote CEC in the dual CEC environment, comprising:
   a first device driver operable on the local CEC;
   a second device driver operable on the remote CEC; and
   a cross cluster mail link coupling the first and second device drivers;
      wherein the second device driver is adapted for, upon a failure of a command sent from the ESSNI to the local CEC:
         receive the command from the ESSNI client application,
         forward the command over the cross cluster mail link to the first device driver, the cross cluster mail link forming at least a portion of the alternative communication path.

8. The system of claim 7, further including a operating system operable on the remote CEC adapted for dispatching the command to a microcode layer to process the command.

9. The system of claim 8, wherein the operating system is further adapted for processing the command, and building a response to the command by the microcode layer.

10. The system of claim 7, wherein the second device driver is further adapted for receiving a response from the local CEC over the cross cluster mail link from the first device driver to be forwarded, via the remote CEC, to the ESSNI client application.

11. A computer program product for communication between an enterprise network interface (ESSNI) client application and a local, central electronic complex (CEC) in a dual CEC environment, the computer program product comprising a computer-readable storage medium having computer-readable program code portions stored therein, the computer-readable program code portions comprising:

a first executable portion for sending a command to the local CEC;

a second executable portion for determining a send failure of the command to the local CEC; and a third executable portion for re-sending the command to the local CEC via an alternative communication path comprising a first device driver integrated into a remote CEC in the dual CEC environment;

wherein the alternative communication path further comprises a cross cluster mail link connecting the first device driver and a second device driver integrated into the local CEC, forming a CEC to CEC mail mechanism.

12. The computer program product of claim 11 further including a fourth executable portion for dispatching the command to a microcode layer to process the command.

13. The computer program product of claim 12, further including a fifth executable portion for processing the command and building a response to the command by the microcode layer.

14. The computer program product of claim 13, further including a sixth executable portion for returning the response via the CEC to CEC message mail mechanism from the second CEC to the first CEC.

15. The computer program product of claim 14, further including a seventh executable portion for sending the response from the first local CEC to the enterprise network interface ESSNI client application.

* * * * *